US007475280B1

(12) United States Patent
Schlomer et al.

(10) Patent No.: US 7,475,280 B1
(45) Date of Patent: Jan. 6, 2009

(54) ACTIVE-ACTIVE SERVER FOR HIGH AVAILABILITY OF DATA REPLICATION MANAGEMENT APPLICATION

(75) Inventors: Todd Benjamin Schlomer, Westminster, CO (US); David Randall Blea, Tucson, AZ (US); Errol Jay Calder, Vail, AZ (US); William Olsen, Tucson, AZ (US)

(73) Assignee: International Business Machines Corporation, Amronk, NY (US)

( * ) Notice: Subject to any disclaimer, the term of this patent is extended or adjusted under 35 U.S.C. 154(b) by 0 days.

(21) Appl. No.: 12/036,257

(22) Filed: Feb. 24, 2008

(51) Int. Cl.
*G06F 11/00* (2006.01)

(52) U.S. Cl. .......................................................... 714/5

(58) Field of Classification Search ..................... 714/5, 714/6

See application file for complete search history.

(56) References Cited

U.S. PATENT DOCUMENTS 5,440,727 A * 8/1995 Bhide et al. ................. 711/117
5,544,347 A * 8/1996 Yanai et al. ................. 711/162
5,742,792 A * 4/1998 Yanai et al. ................. 711/162
5,857,208 A * 1/1999 Ofek .......................... 707/204
6,484,177 B1 11/2002 Van Huben et al.
7,228,460 B2 * 6/2007 Pomaranski et al. .......... 714/43
7,383,408 B2 * 6/2008 Meiri et al. ................. 711/167
2003/0005028 A1 1/2003 Dritschler et al.
2003/0172316 A1 * 9/2003 Tremblay et al. .............. 714/7
2005/0160137 A1 7/2005 Ishikawa et al.
2005/0283658 A1 12/2005 Clark et al.
2006/0047852 A1 3/2006 Shah et al.
2007/0078982 A1 4/2007 Aidun et al.

* cited by examiner

*Primary Examiner*—Bryce P Bonzo
(74) *Attorney, Agent, or Firm*—Max Value IP, LLC

(57) ABSTRACT

This presentation allows for two or more storage management servers to be in an active high availability (HA) state for the same set of storage devices and copy services relationships; rather than having a single server be in an active HA state and the other servers being in a standby HA state. This makes each HA server to be able to accept commands at any time so that they will not have to issue a takeover command to a standby server just to start issuing commands. This will also ensure that the data replication pairs will continue copying data until an event of an actual disaster; in which the active servers would then cause the data replication to be suspended so that a consistent set of data is secured on the secondary site.

1 Claim, 2 Drawing Sheets

ACTIVE-ACTIVE SERVER FOR HIGH AVAILABILITY OF DATA REPLICATION MANAGEMENT APPLICATION

BACKGROUND OF THE INVENTION

In disaster recovery solutions, high availability (HA) of the storage management servers is necessary in case of primary site failure. In a storage management product such as TotalStorage® Productivity Center for Replication (TPC-R), HA feature mirrors the state and data of the TPC-R server from a primary site to a secondary site. This feature creates the high availability aspect of the solution by keeping the brains of the TPC-R server consistent on two separate servers in case one of the TPC-R servers goes down.

The storage management server that is the primary in an HA relationship is referred to as the active server, while the secondary storage management server is referred to as the standby. If the primary storage management server goes down, then the secondary server can "takeover" the HA relationship between the servers to become the new active server. The primary storage management server still considers itself an active server. In order to even use the standby server, a user would have to first issue a takeover command; which would then allow commands to be accepted by the standby server since it would then be in an "active" HA state.

One drawback for this HA solution is that the customer has to initiate a "takeover" command to the standby in order for it to start working and managing their storage devices. This becomes a manual procedure in the event of a disaster that would require an administrator to perform. It was designed this way to protect from having two storage management servers managing the same set of storage devices at any one given time. Otherwise, either storage management server can possibly have errors if the alternate storage management server is trying to control the storage devices as neither would know what the other is doing.

Another drawback for this type of HA solution is that when the administrator wants to perform maintenance on the storage management servers, they will at some time have two storage management servers trying to manage the same set of storage devices. This will be a problem because the traditional active/standby relationship of the HA servers will not work when there are two active servers trying to control the data at the same time.

In existing active/standby HA state methodology, there could only be one storage management server controlling a set of devices in a data replication environment. If there were multiple "active" storage management servers controlling the same data replication devices, then each server would act independently of each other for different events. So, if there was a replication device pair removed from one of the storage management servers, the alternate storage management server would cause the rest of the replication pairs to suspend and stop copying data. This is undesirable since any new data would not be copied.

An embodiment of this invention addresses the above issues by providing for multiple active high availability storage management servers.

SUMMARY OF THE INVENTION

An embodiment of this invention allows for two or more storage management servers to be in an active high availability (HA) state for the same set of storage devices and copy services relationships; rather than having a single server be in an active HA state and the other servers being in a standby HA state. This makes each HA server to be able to accept commands at any time so that they will not have to issue a takeover command to a standby server just to start issuing commands. By having two or more active servers, the user can be sure that there is always at least one server controlling the storage devices at any time if one active HA server goes down.

In an HA environment that allows multiple storage management servers to be in an active state, this allows for greater flexibility when controlling data replication devices. Each active server in the HA environment would be notified of changes made to a single active server so that those change would be migrated to the other active servers in the HA environment. This will ensure that the data replication pairs will continue copying data until an event of an actual disaster; in which the active servers would then cause the data replication to be suspended so that a consistent set of data is secured on the secondary site.

By providing multiple storage management servers to be in an active HA state, this also allows a user to issue commands on the secondary site to the storage management server at that location rather than having to connect to the primary site just to issue commands.

DETAILED DESCRIPTION OF THE PREFERRED EMBODIMENTS

In storage management, server uses a session to manage activities on a set of storage devices that are in a data replication environment. There can be any number of sessions, each controlling different types of data replication (point in time, synchronous, asynchronous, etc), different storage devices, and replication pairs. When a user issues a command to storage management, they will usually tell a session to start, suspend, or stop (in addition to other basic commands). The user can also add or remove replication volume pairs in the session while it is running or stopped.

Figure 1:
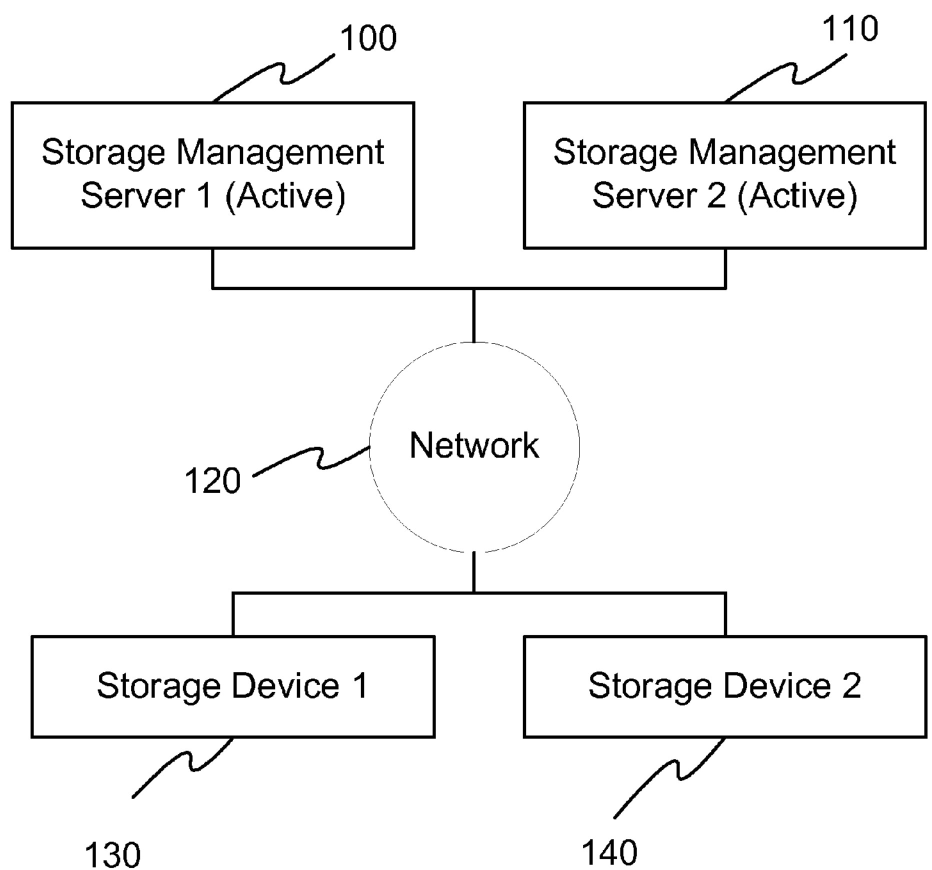
FIG. 1 is a schematic diagram of the system.

FIG. 1 is the schematic diagram of one embodiment of the invention represented by Storage management servers 1 and 2 (100 and 110, respectively). The Servers are connected to Storage Devices 1 and 2 (130 and 140, respectively) via the network (120).

Figure 2:
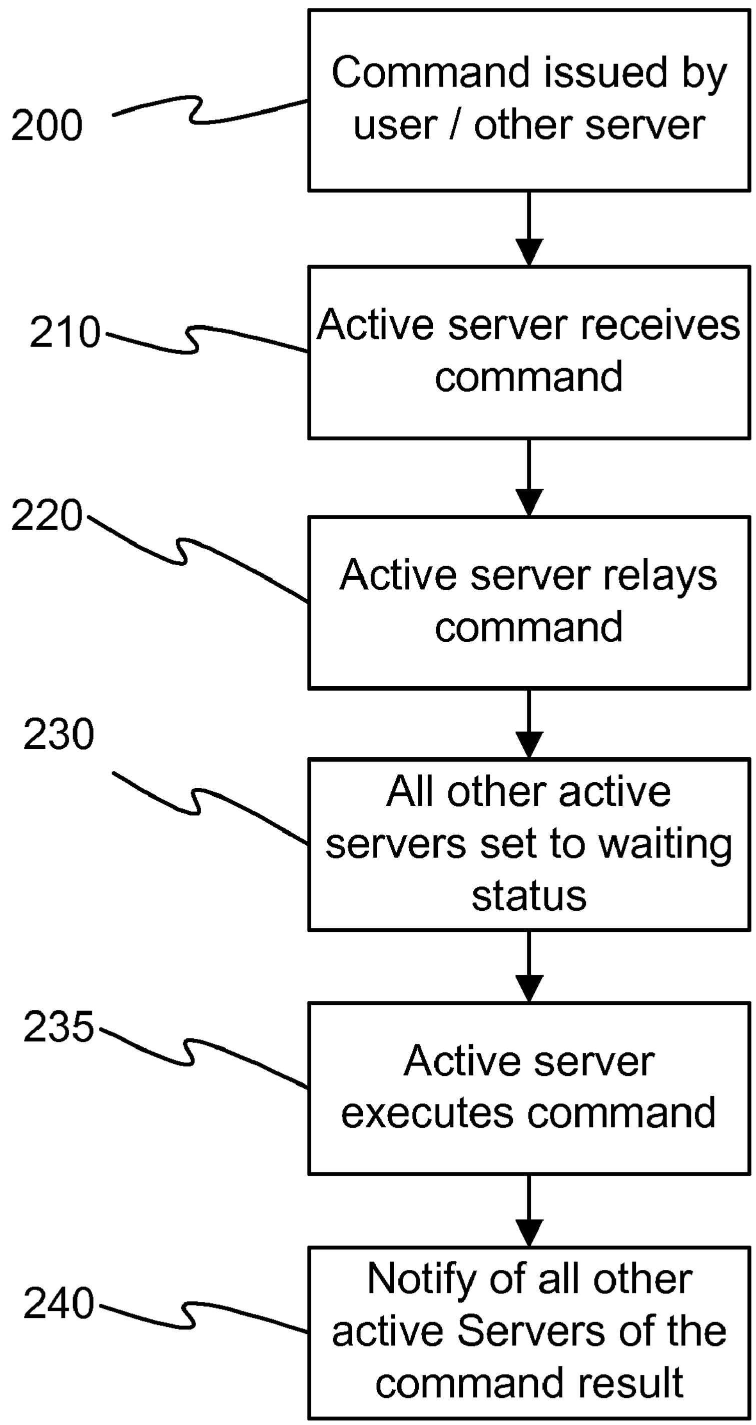
FIG. 2 is a step by step flow diagram of the system when a command is issued.

FIG. 2 is a flow diagram of one embodiment of the invention. A storage management command is issued to an active HA storage management server (210) by a user or by another server (200). The active server then relays the command (220) to other active storage management servers to put them in a waiting status (230). After the execution of the command (235) the original active server notifies the other active servers of the result of the command processing in order for them to reflect the operation performed by the original active server and resume normal operation (240).

In one embodiment, the multiple active HA storage management servers communicate with the other active servers when commands are issued in storage management by either the user or by an internal command. When a command is issued to an active storage management server in a HA relationship with other active storage management servers, such that it would change the internal state of the storage management server (i.e., causing it to be no longer consistent with the other storage management servers), the storage management server will first relay a message to the other storage management active servers about the command that is going to be performed. Once the other active HA storage management servers receive this command message, they will change into a waiting state for any types of events that would occur as a result of this command action. The main active storage management server that had the command issued to it will then process the command and once completed notify the other active HA storage management servers that the command completed successfully or if the command failed. The other storage management servers will then be able to reflect the operation that the main active HA storage management server just performed.

One embodiment of the invention performs the following steps when a storage management server is in a HA relationship with other active storage management servers.

1. The storage management server receives a command from user or other modules.
2. The storage management server notifies other active storage management servers (alternate active servers) in HA environment.
3. The alternate active storage management servers will update their internal state with the command preprocessing.
4. The alternate active storage management servers will then wait for any type of command process events to occur and for the command completion notification
   Such events include changes to the hardware data replication environment that would normally be errors unless the alternate active HA server is notified first.
   The data replication changes would be expected since the alternate active storage management servers are notified first for any changes to be expected due to a command completion.
5. The storage management server processes the command.
6. The storage management server notifies the alternate active storage management servers in the HA environment of the command results (successful, failure, etc).
7. The alternate active servers then complete the processing of the command for the relayed results.

An embodiment of the invention is a method for providing high availability of data replication management. The method is comprised of:

A first storage management server receives a storage management command. The first storage management server is in a high availability environment and the first storage management server is active. The first storage management server communicates with one or more alternate storage management servers within the high availability environment; A second storage management server of the one or more alternate storage management servers is active.

The first storage management server notifies the second storage management server about the storage management command.

Moreover, the second storage management server updates an internal state with a command process status.

The second storage management server monitors for a command processing event or a command completion notification. The command processing event is of a type of command processing event types. The command processing event types comprises: change to a hardware data replication environment type and a data replication change type.

The first storage management server processes the storage management command.

The first storage management server notifies the second storage management server about a result of the processing of the storage management command using the command completion notification.

The second storage management server completes a process of the storage management command based on the result.

A system, apparatus, or device comprising one of the following items is an example of the invention: active server, data replication, high availability, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of high availability and its management.

Any variations of the above teaching are also intended to be covered by this patent application.

The invention claimed is:

1. A method for providing high availability of data replication management, said method comprising:

a first storage management server receiving a storage management command;

wherein said first storage management server is in a high availability environment;

wherein said first storage management server is active;

wherein said first storage management server communicates with one or more alternate storage management servers within said high availability environment;

wherein a second storage management server of said one or more alternate storage management servers is active;

said first storage management server notifying said second storage management server about said storage management command;

said second storage management server updating an internal state with a command processing status;

said second storage management server monitoring for a command processing event or a command completion notification;

wherein said command processing event is of a type of command processing event types;

wherein said command processing event types comprises: change to a hardware data replication environment type and a data replication change type;

said first storage management server processing said storage management command;

said first storage management server notifying said second storage management server about a result of said processing of said storage management command using said command completion notification; and said second storage management server completing a processing of said storage management command based on said result.

* * * * *